(12) United States Patent
Liu

(10) Patent No.: US 12,001,474 B2
(45) Date of Patent: Jun. 4, 2024

(54) INFORMATION DETERMINING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 131 days.

(21) Appl. No.: 17/721,295

(22) Filed: Apr. 14, 2022

(65) Prior Publication Data
US 2022/0237222 A1 Jul. 28, 2022

Related U.S. Application Data

(63) Continuation of application No. PCT/CN2021/075270, filed on Feb. 4, 2021.

(30) Foreign Application Priority Data

Mar. 24, 2020 (CN) .......................... 202010213262.1

(51) Int. Cl.
G06F 16/435 (2019.01)
G06F 16/45 (2019.01)
G06N 20/00 (2019.01)

(52) U.S. Cl.
CPC ............ *G06F 16/435* (2019.01); *G06F 16/45* (2019.01); *G06N 20/00* (2019.01)

(58) Field of Classification Search
CPC ....... G06F 16/435; G06F 16/45; G06N 20/00; G06N 3/045; G06N 3/08; G06N 5/02
See application file for complete search history.

(56) References Cited

U.S. PATENT DOCUMENTS

2018/0096677 A1* 4/2018 Pollet ..................... G06N 3/045
2018/0130019 A1* 5/2018 Kolb ................. G06F 16/24578
(Continued)

FOREIGN PATENT DOCUMENTS

CN 106547908 A 3/2017
CN 109358744 A 2/2019
(Continued)

OTHER PUBLICATIONS

The World Intellectual Property Organization (WIPO) International Search Report for PCT/CN2021/075270 dated Apr. 15, 2021 5 Pages (including translation).

*Primary Examiner* — Mark D Featherstone
*Assistant Examiner* — Kweku William Halm
(74) *Attorney, Agent, or Firm* — ANOVA LAW GROUP, PLLC

(57) ABSTRACT

An information determining method includes: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, and determining the selected information as information about the target multimedia resource.

20 Claims, 7 Drawing Sheets

Separately perform frame extraction on the target multimedia resource and the multiple candidate multimedia resources, to obtain multiple video frames corresponding to the target multimedia resource and multiple video frames corresponding to the multiple candidate multimedia resources — 2013

Separately process the multiple video frames corresponding to the target multimedia resource and the multiple video frames corresponding to the multiple candidate multimedia resources based on a second feature extraction model, to obtain the feature vector of the target multimedia resource and the feature vectors of the multiple candidate multimedia resources — 2014

(56) References Cited

U.S. PATENT DOCUMENTS

| | | | |
|---|---|---|---|
| 2018/0288431 A1* | 10/2018 | Liu | G06V 40/171 |
| 2020/0037036 A1 | 1/2020 | Foerster et al. | |
| 2020/0258237 A1* | 8/2020 | Poddar | G06T 7/20 |
| 2021/0073449 A1* | 3/2021 | Segev | G06F 30/27 |

FOREIGN PATENT DOCUMENTS

| | | | |
|---|---|---|---|
| CN | 109359592 A | | 2/2019 |
| CN | 110704598 A | | 1/2020 |
| CN | 110781323 A | * | 2/2020 |
| CN | 111444357 A | | 7/2020 |

* cited by examiner

INFORMATION DETERMINING METHOD AND APPARATUS, COMPUTER DEVICE, AND STORAGE MEDIUM

RELATED APPLICATION(S)

This application is a continuation application of PCT Patent Application No. PCT/CN2021/075270 filed on Feb. 4, 2021, which claims priority to Chinese Patent Application No. 202010213262.1, entitled "CONTENT INFORMATION DETERMINING METHOD AND APPARATUS, COMPUTER DEVICE, AND STORAGE MEDIUM" filed on Mar. 24, 2020, all of which are incorporated by reference in entirety.

FIELD OF THE TECHNOLOGY

The present disclosure relates to the field of computer technologies, and in particular, to an information determining method and apparatus, a computing device, and a storage medium.

BACKGROUND

With the rapid development and wide popularity of the Internet, multimedia resources available via the Internet become increasingly abundant. Usually, when watching multimedia resources, a user can also post information for the multimedia resources, and when viewing the multimedia resources, other users can view the information posted by the user.

SUMMARY

Embodiments of the present disclosure provide an information determining method and apparatus, a computing device, and a storage medium, which can improve accuracy of content information determining. The technical solutions are as follows.

In one aspect, the present disclosure provides an information determining method, the method including: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, and determining the selected information as information about the target multimedia resource.

In another aspect, the present disclosure provides an information determining apparatus, including: a memory storing computer program instructions; and a processor coupled to the memory and configured to execute the computer program instructions and perform: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, and determine the selected information as information about the target multimedia resource.

In yet another aspect, the present disclosure provides a non-transitory computer-readable storage medium storing computer program instructions executable by at least one processor to perform: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, and determining the selected information as information about the target multimedia resource.

The technical solutions provided in the embodiments of the present disclosure produce at least the following beneficial effects:

According to the method, the apparatus, the computing device, and the storage medium provided in the embodiments of the present disclosure, a feature vector of a target multimedia resource and feature vectors of multiple candidate multimedia resources are acquired; a reference multimedia resource whose feature vector matches the feature vector of the target multimedia resource is selected from the multiple candidate multimedia resources, so that the acquired reference multimedia resource can match the target multimedia resource; and information matching the target multimedia resource is selected from multiple pieces of information about the reference multimedia resource according to the multiple pieces of information, and the selected information is determined as information about the target multimedia resource. This provides a manner of automatically determining information for a target multimedia resource, and can ensure that the determined information matches the target multimedia resource, thereby improving information accuracy.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
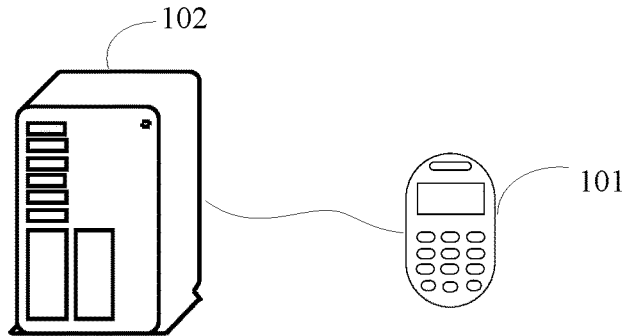
FIG. 1 is a schematic diagram of an implementation environment according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

It may be understood that, the terms "first", "second", "third", and the like used in the present disclosure may be used for describing various concepts in the present disclosure. However, the concepts are not limited by the terms unless otherwise specified. The terms are merely used for distinguishing one concept from another concept. For example, without departing from the scope of the present disclosure, a first threshold may be referred to as a second threshold, and the second threshold may be referred to as the first threshold.

For the terms "at least one", "a plurality of", "each", and "any" used in the present disclosure, "at least one" refers to "one", "two", or "more", "a plurality of" refers to "two or "more", "each" refers to "each of a plurality of corresponding", and "any" refers to "any one of a plurality of". For example, when "a plurality of elements" refers to "three elements", "each" refers to "each of the three elements", and "any" refers to "any one of the three elements", that is, may be the first element, the second element, or the third element.

For convenience of understanding the technical process of the embodiments of the present disclosure, terms in the embodiments of the present disclosure are described.

Feeds (an information form): A website transmits information to users in the form of feeds sorted in a timeline manner. Timeline is the most original, intuitive, and basic display form of feeds.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology includes fields such as a computer vision (CV) technology, a speech processing technology, a natural language processing technology, and machine learning/deep learning (DL).

NLP is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Machine learning (ML) is a multi-field interdisciplinary subject involving the probability theory, statistics, the approximation theory, convex analysis, the algorithm complexity theory, and the like, which specializes in the study of how a computer simulates or implements learning behavior of humans to obtain new knowledge or skills, and reorganize an obtained knowledge structure to keep improving its performance. ML is a core of AI and a fundamental way to make the computer intelligent, and is applicable to various fields of AI. ML and DL generally include technologies such as an artificial neural network, a belief network, reinforcement learning, transfer learning, inductive learning, and learning from demonstrations.

DL is originated from research about artificial neural networks. A multi-layer perceptron including a plurality of hidden layers is one of deep learning structures. During the deep learning, an attribute type or feature is represented by combining lower-layer features into a more abstract higher layer, so as to discover distributed feature representation of data.

In solutions provided in the embodiments of the present disclosure, a first feature extraction model and a second feature extraction model are trained based on a machine learning technology of artificial intelligence, feature vectors of multimedia resources are acquired by using the trained first feature extraction model and second feature extraction model, and subsequently content information is determined for a target multimedia resource.

FIG. 1 is a schematic diagram of an implementation environment according to an embodiment of the present disclosure. As shown in FIG. 1, the implementation environment includes a terminal 101 and a server 102. The terminal 101 establishes a communication connection with the server 102, and the two parties interact with each other through the established communication connection. The terminal 101 is a terminal of various types, such as a mobile phone, a computer, and a tablet computer. The server 102 is one server, or a server cluster including several servers, or a cloud computing server center.

The server 102 determines, according to a feature vector of a target multimedia resource and feature vectors of multiple candidate multimedia resources, a reference multimedia resource whose feature vector corresponds to the feature vector of the target multimedia resource, selects information corresponding to the target multimedia resource from multiple pieces of information about the reference multimedia resource, and determines the selected information as information about the target multimedia resource. When the terminal 101 displays the target multimedia resource, the server 102 sends the target multimedia resource and the corresponding information to the terminal 101, for viewing by a user.

In certain embodiment(s), the feature vector corresponds to the feature vector with a matching degree, which makes the feature vector matching the feature vector.

In certain embodiment(s), the information corresponds to the target multimedia resource with a matching degree, which makes the information matching the target multimedia resource.

The method provided in this embodiment of the present disclosure may be applied to a scenario of determining content information for a multimedia resource.

For example, in a scenario of migration of comment information for a video resource: after acquiring a video resource, a computing device uses a comment information determining method provided in this embodiment of the present disclosure to migrate comment information of other video resources as comment information of the video resource, so that other users can view the comment information when watching the video resource, thereby increasing a quantity of pieces of comment information for the video resource, thus improving the popularity of the video resource.

For another example, in a scenario of migration of comment information for an article: after acquiring an article posted by a user, an application server uses a comment information determining method provided in this embodiment of the present disclosure to migrate multiple pieces of comment information of other articles as comment information of the article, so that there are multiple pieces of comment information for a newly posted article, thereby increasing a quantity of pieces of comment information for this article. By checking quantities of pieces of comment information of articles, a user selects this article for reading, thus improving the attractiveness of this article to the user.

The information determining method provided in this embodiment of the present disclosure is applicable to a computing device. The computing device includes a terminal or a server. The terminal is a terminal of various types, such as a mobile phone, a computer, and a tablet computer. The server is one server, or a server cluster including several servers, or a cloud computing server center.

Figure 2:
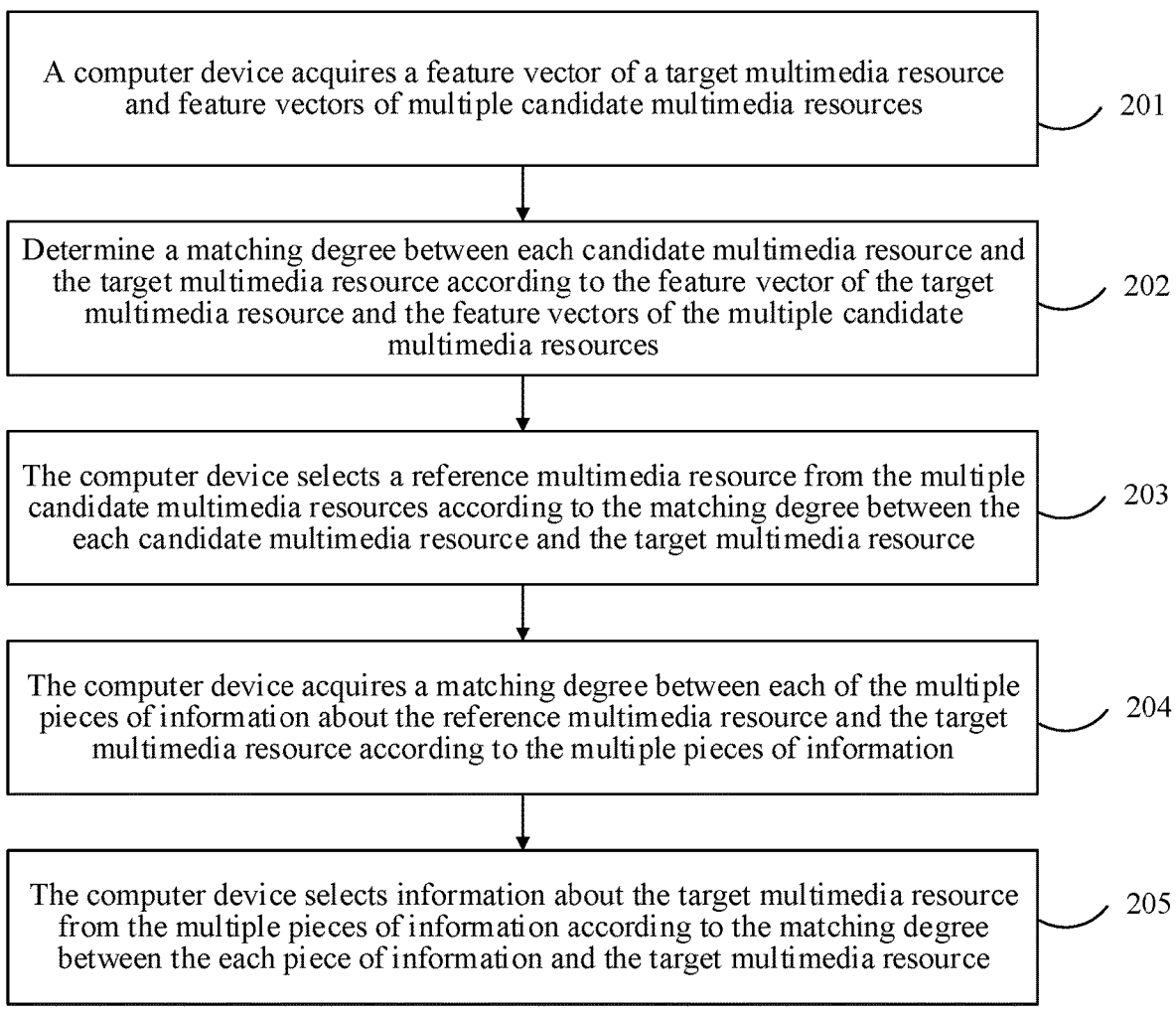
FIG. 2 is a schematic flowchart of an information determining method according to embodiment(s) of the present disclosure.

FIG. 2 is a flowchart of an information determining method according to an embodiment of the present disclosure, the method being applicable to a computing device. As shown in FIG. 2, the method includes:

201. The computing device acquires a feature vector of a target multimedia resource and feature vectors of multiple candidate multimedia resources.

The multimedia resources include a video resource, an audio resource, a text resource, an image resource, and the like. The multimedia resource is a resource posted by any poster, for example, a multimedia resource posted by an administrator of an application, or a multimedia resource posted by a user of an application.

In one implementation, a target application is installed in a terminal. A poster posts a multimedia resource through the target application. The terminal uploads the posted multimedia resource to an application server corresponding to the target application. The application server stores the multimedia resource. The target application is a video application, a music application, a reading application, or the like.

In this embodiment of the present disclosure, the target multimedia resource and the candidate multimedia resources are multimedia resources belonging to the same type. For example, the target multimedia resource and the candidate multimedia resources are each a video resource or a text resource. Alternatively, the target multimedia resource and the candidate multimedia resources are multimedia resources belonging to different types. For example, the target multimedia resource is a text resource, and the candidate multimedia resources are video resources. Among multiple multimedia resources, any multimedia resource is used as a target multimedia resource, and the other multimedia resources are used as candidate multimedia resources; or a multimedia resource meeting a condition is used as a target multimedia resource, and the other multimedia resources are used as candidate multimedia resources. For example, based on quantities of pieces of information of multimedia resources, a multimedia resource whose quantity of pieces of information is less than a fourth threshold is used as a target multimedia resource, and multimedia resources whose quantities of pieces of information are each not less than the fourth threshold are used as candidate multimedia resources.

A feature vector is a vector used for representing feature information of a multimedia resource. The feature vector includes multiple dimensions. Because different multimedia resources have different feature information, the different multimedia resources correspond to different feature vectors.

In this embodiment of the present disclosure, a feature vector of a multimedia resource is acquired in the following two manners.

Figure 3:
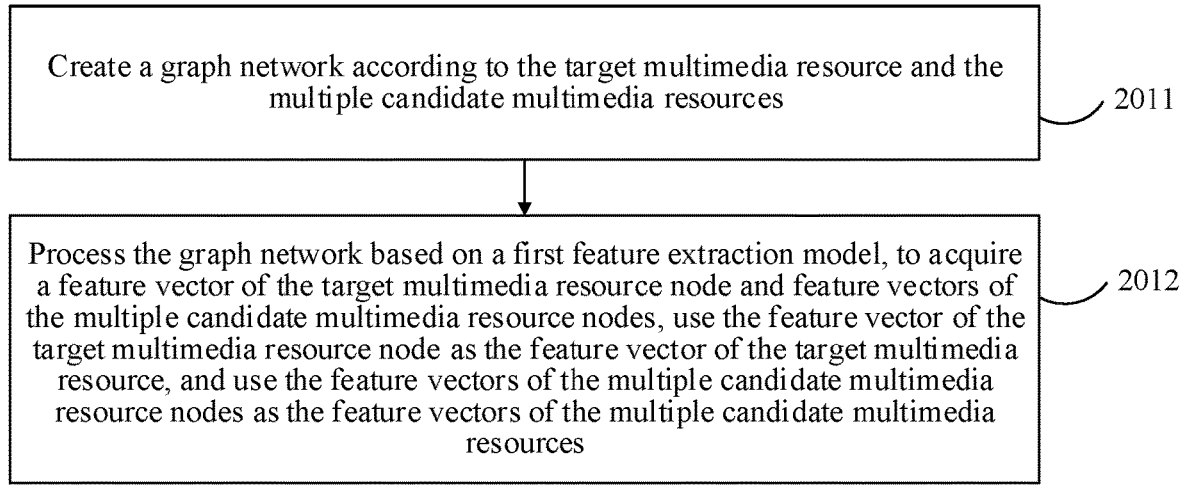
FIG. 3 is a schematic flowchart of an information determining method according to embodiment(s) of the present disclosure.

As shown in FIG. 3, a first manner includes the following steps 2011 and 2012:

2011. Create a graph network according to the target multimedia resource and the multiple candidate multimedia resources.

The graph network is a representation of connection relationships between multiple nodes. The graph network includes a target multimedia resource node corresponding to the target multimedia resource and multiple candidate multimedia resource nodes corresponding to the multiple candidate multimedia resources. Among multiple multimedia resource nodes, any two multimedia resource nodes meeting a first association condition are connected to obtain the graph network.

For a manner of determining whether multimedia resource nodes meet the first association condition, in one implementation, according to a matching degree between any two multimedia resources, in response to the matching degree being greater than a fifth threshold, it is determined that multimedia resource nodes corresponding to the any two multimedia resources meet the first association condition. The matching degree between any two multimedia resources is used for representing a degree of matching between the two multimedia resources.

In one implementation, step 2011 includes the following steps 1 and 2:

Step 1. Perform word segmentation on a text resource in the target multimedia resource and text resources in the multiple candidate multimedia resources to obtain multiple first words.

The text resource is a resource including text. When a multimedia resource is a text resource, a text resource of the multimedia resource is the multimedia resource. When a multimedia resource is a video resource, a text resource of the multimedia resource includes a title and introduction information of the multimedia resource, or includes subtitle information in the video resource. When a multimedia resource is an image resource, a text resource of the multimedia resource includes a title and introduction information of the multimedia resource, or includes text information in the image resource. When a multimedia resource is an audio resource, a text resource of the multimedia resource includes a title and introduction information of the multimedia resource, or includes a text resource converted from the audio resource.

Word segmentation is a process of dividing multiple consecutive words in a text resource into words. Word segmentation is performed on the text resource in the target multimedia resource, and word segmentation is performed on a text resource in each candidate multimedia resource, to obtain multiple first words of the text resources after word segmentation.

Because different multimedia resources may include the same word, the obtained multiple first words include the same word. Alternatively, in one implementation, the step 2011 further includes: separately performing word segmentation on the multiple candidate multimedia resources and the target multimedia resource to obtain multiple third words, and de-duplicating the multiple third words to obtain the multiple first words. The multiple third words are de-duplicated, and the same words in the multiple third words are filtered out, so that the obtained multiple first words are different, thereby avoiding duplication of words.

Step 2. Create a graph network according to the target multimedia resource, the multiple candidate multimedia resources, and the multiple first words.

The graph network includes a target multimedia resource node corresponding to the target multimedia resource, multiple candidate multimedia resource nodes corresponding to the multiple candidate multimedia resources, and multiple word nodes corresponding to the multiple first words. During creation of multiple word nodes, if the multiple first words include the same first word, only one word node corresponding to the same first word is created in the graph network. Among the multiple word nodes and the multiple multimedia resource nodes, a word node and a multimedia resource node that meet a second association condition are connected.

For a manner of determining whether a word node and a multimedia resource node meet the second association condition, in one implementation, for any first word and any multimedia resource, in response to the text resource of the multimedia resource including the first word, it is determined that the word node corresponding to the first word and the multimedia resource node corresponding to the multimedia resource meet the second association condition.

In another implementation, in response to an occurrence frequency of any first word in a text resource of any multimedia resource being greater than a first threshold, it is determined that a word node corresponding to the first word and a multimedia resource node corresponding to the multimedia resource meet the second association condition.

The occurrence frequency represents a quantity of times of occurrence of a word in a multimedia resource. The first threshold is an arbitrarily set value, such as 5 or 6. A higher occurrence frequency of a word in a multimedia resource indicates a higher matching degree between the word and the multimedia resource. A lower occurrence frequency of a word in a multimedia resource indicates a lower matching degree between the word and the multimedia resource.

During construction of the graph network, an occurrence frequency of each first word in each multimedia resource is determined, and when the occurrence frequency of the any word in the any multimedia resource is greater than the first threshold, a word node corresponding to the word and a multimedia resource node corresponding to the multimedia resource are connected, to obtain the graph network.

For a manner of determining the occurrence frequency of the first word in the multimedia resource, in one implementation, traversal is performed in any multimedia resource according to any first word, to obtain a quantity of times of occurrence of the first word in the multimedia resource, as an occurrence frequency of the first word in the multimedia resource.

In addition, among multiple first words, different first words have the same meaning, that is, different first words are synonymous words. Therefore, during construction of the graph network, word nodes having the same meaning are connected, so that the graph network includes relationships between word nodes, thereby improving accuracy of the obtained graph network.

2012. Process the graph network based on a first feature extraction model, to acquire a feature vector of the target multimedia resource node and feature vectors of the multiple candidate multimedia resource nodes, use the feature vector of the target multimedia resource node as the feature vector of the target multimedia resource, and use the feature vectors of the multiple candidate multimedia resource nodes as the feature vectors of the multiple candidate multimedia resources.

The graph network is processed based on the first feature extraction model, and the first feature extraction model outputs a feature vector of each multimedia resource node, so that the feature vector of the target multimedia resource node and the feature vectors of the multiple candidate multimedia resource nodes are obtained.

The first feature extraction model is a graph convolutional network (GCN) model. The GCN model extracts a feature of each node in the graph network, obtains a feature vector of each node through graph embedding, and processes the graph network based on the GCN model, to implement node classification, graph classification, and link prediction in the graph network. The GCN model is obtained through training according to a semi-supervised learning method, and the feature vector of each node in the graph network is acquired based on the trained GCN model. Alternatively, the GCN is not trained, and the graph network is processed based on the GCN model with initialized parameters, to obtain the feature vector of each node. The GCN model is acquired as a DeepWalk (a neural network) model, or a Word2vec (or Word To Vector, a word vector model). Alternatively, the first feature extraction model is a graph attention network (GAT) model. The GAT model introduces an attention mechanism during processing of the graph network, and determines a relationship between adjacent nodes according to weights between the adjacent nodes, thereby improving accuracy of the obtained feature vectors of the target multimedia resource node and the multiple candidate multimedia resource nodes.

In one implementation, after the feature vector of each node in the graph network is acquired based on the trained GCN model, the graph network can also be used as a sample to further train the GCN model.

In this embodiment of the present disclosure, because the graph network includes relationships between multiple multimedia resources and multiple words, the subsequent acquisition of the feature vector of each multimedia resource through the graph network can integrate the relationships between the multiple multimedia resources and the multiple words into the feature vectors. This improves accuracy of the acquired feature vectors of the multimedia resources.

Figure 4:
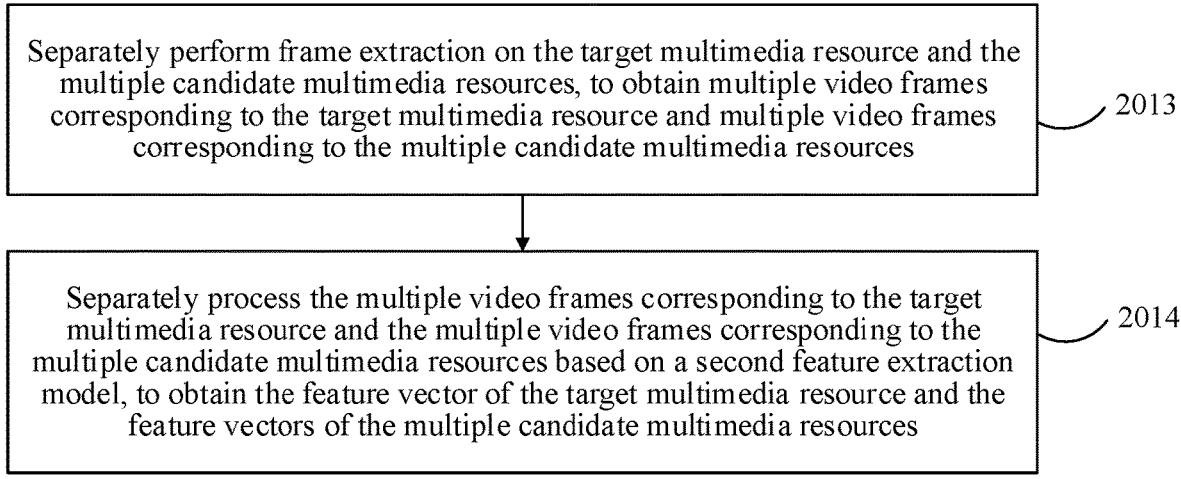
FIG. 4 is a schematic flowchart of an information determining method according to embodiment(s) of the present disclosure.

As shown in FIG. 4, a second manner includes the following steps 2013 and 2014:

2013. Separately perform frame extraction on the target multimedia resource and the multiple candidate multimedia resources, to obtain multiple video frames corresponding to the target multimedia resource and multiple video frames corresponding to the multiple candidate multimedia resources.

The multimedia resources include a video resource. Each video resource includes multiple video frames. Therefore, frame extraction may be performed on each video resource, to obtain multiple video frames corresponding to each multimedia resource. For example, a duration of the video resource is 20 seconds, and each second includes one video frame. In this implementation, frame extraction is performed on the video resource, to obtain 20 video frames, that is, obtain 20 images.

2014. Separately process the multiple video frames corresponding to the target multimedia resource and the multiple video frames corresponding to the multiple candidate multimedia resources based on a second feature extraction model, to obtain the feature vector of the target multimedia resource and the feature vectors of the multiple candidate multimedia resources.

The second feature extraction model is a model for acquiring the feature vector of the multimedia resource, a convolutional neural network (CNN) model, or another model.

In one implementation, step 2014 includes: separately processing multiple video frames corresponding to any multimedia resource based on the second feature extraction model, to obtain feature vectors of the multiple video frames; and fusing the feature vectors of the multiple video frames, to obtain a feature vector of the multimedia resource.

For a manner of acquiring a feature vector of a video frame, in one implementation, the second feature extraction model includes a feature detection submodel and a global feature aggregation submodel. During acquisition of a feature vector of any video frame, local feature points of the video frame are detected based on the feature detection submodel, to obtain detection results of multiple local features in the video frame. The multiple local features are aggregated based on the global feature aggregation submodel, to obtain the feature vector of the video frame.

202. Determine a matching degree between each candidate multimedia resource and the target multimedia resource according to the feature vector of the target multimedia resource and the feature vectors of the multiple candidate multimedia resources.

The matching degree is used for representing a degree of matching between a candidate multimedia resource and the target multimedia resource. A higher matching degree indicates a higher degree of correlation between the candidate multimedia resource and the target multimedia resource. A lower matching degree indicates a lower degree of correlation between the candidate multimedia resource and the target multimedia resource. The matching degree between the candidate multimedia resource and the target multimedia resource is represented by using a cosine distance, a Euclidean distance, a Mahalanobis distance, a Chebyshev distance, a Hamming distance, a standardized Euclidean distance, or the like between feature vectors of the candidate multimedia resource and the target multimedia resource.

In one implementation, a matching degree similarity (A,B) between a candidate multimedia resource and the target multimedia resource is determined according to a feature vector A of the candidate multimedia resource and a feature vector B of the target multimedia resource. The feature vector A, the feature vector B, and the matching degree similarity (A,B) meet the following relationship:

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

where $\|A\|$ is used for representing a length of the feature vector A, $\|B\|$ is used for representing a length of the feature vector B, and $A_i$ represents a value of an ith dimension in the feature vector A; and $B_i$ represents a value of an ith dimension in the feature vector B, i is a positive integer not less than 1 and not greater than n, n is used for representing a quantity of dimensions included in the feature vector, and n is a positive integer greater than or equal to 2.

203. The computing device selects a reference multimedia resource from the multiple candidate multimedia resources according to the matching degree between the each candidate multimedia resource and the target multimedia resource.

A matching degree between the reference multimedia resource and the target multimedia resource is greater than a matching degree between another candidate multimedia resource and the target multimedia resource.

For a manner of selecting the reference multimedia resource, in one implementation, a candidate multimedia resource whose matching degree with the target multimedia resource is greater than a second threshold is selected from the multiple candidate multimedia resources and determined as the reference multimedia resource.

The second threshold is an arbitrarily set value, such as 0.5 or 0.6. If the matching degree between the candidate multimedia resource and the target multimedia resource is greater than the second threshold, it indicates that the candidate multimedia resource matches the target multimedia resource. In this implementation, information about the candidate multimedia resource is determined as information about the target multimedia resource.

In another implementation, the multiple candidate multimedia resources are sorted in ascending order of matching degrees with the target multimedia resource, and a preset quantity of candidate multimedia resources having the highest matching degree are selected from the multiple candidate multimedia resources and determined as reference multimedia resources.

The preset quantity is an arbitrarily set value, such as 3 or 4. Because higher matching degrees between the candidate multimedia resources and the target multimedia resource indicate higher degrees of matching between the candidate multimedia resources and the target multimedia resource, the preset quantity of candidate multimedia resources having the highest matching degree are selected from the multiple candidate multimedia resources as the reference multimedia resources.

This embodiment of the present disclosure is described by using an example in which the reference multimedia resource is determined based on the matching degree between the candidate multimedia resource and the target multimedia resource. However, in another embodiment, steps 202 and 203 may not be performed, and the reference multimedia resource matching the target multimedia resource may be determined in other manners.

204. The computing device acquires a matching degree between each of the multiple pieces of information about the reference multimedia resource and the target multimedia resource according to the multiple pieces of information.

In one implementation, information about any multimedia resource is content information, and the computing device acquires a matching degree between each of multiple pieces of content information of the reference multimedia resource and the target multimedia resource according to the multiple pieces of content information.

The content information of the any multimedia resource includes comment information, detailed information, or other information. The comment information is information generated by commenting on the multimedia resource. The detailed information is information that introduces the multimedia resource. For example, the detailed information includes a resource type of the multimedia resource, a synopsis of the multimedia resource, and the like. A matching degree between any content information of the reference multimedia resource and the target multimedia resource is used for representing a degree of matching between the content information and the target multimedia resource. A higher matching degree indicates a higher degree of matching between the content information and the target multimedia resource. A lower matching degree indicates a lower degree of matching between the content information and the target multimedia resource. Because the reference multimedia resource has multiple pieces of content information, content information can be determined for the target multimedia resource by determining a matching degree between each piece of content information and the target multimedia resource.

In one implementation, the computing device performs word segmentation on any piece of information, to obtain multiple second words; acquires a matching degree between each second word and the target multimedia resource according to an occurrence frequency of the each second word in the target multimedia resource; and weights the matching degrees between the multiple second words and the target multimedia resource according to weights of the multiple second words, to obtain a matching degree between the any piece of information and the target multimedia resource.

Figure 5:
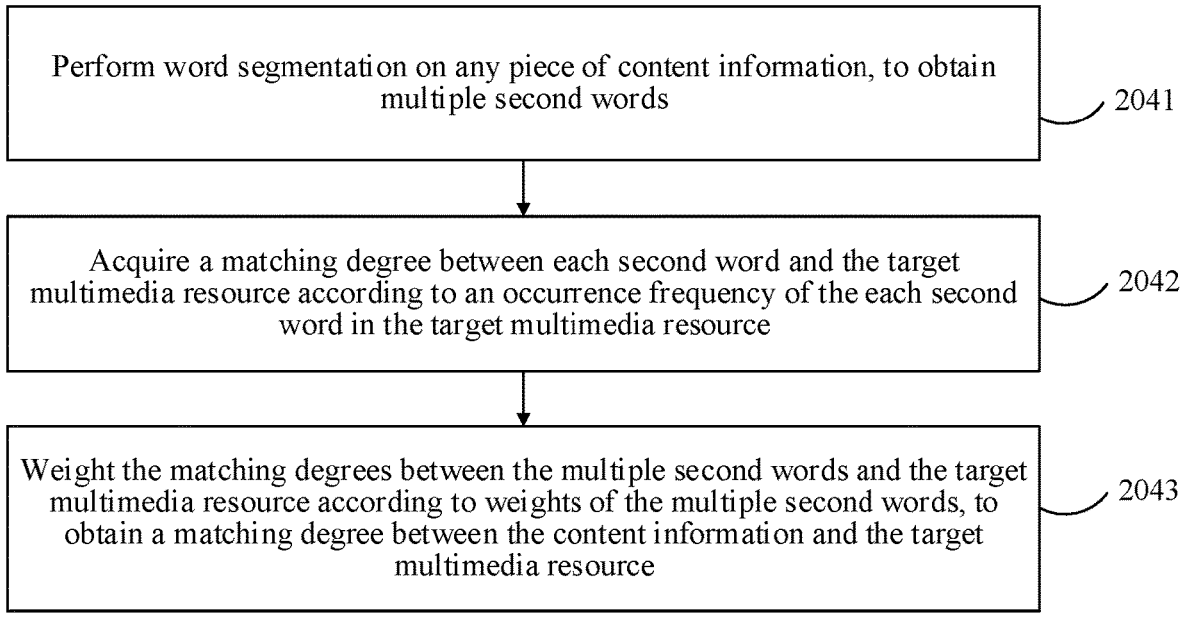
FIG. 5 is a schematic flowchart of an information determining method according to embodiment(s) of the present disclosure.

In one implementation, as shown in FIG. 5, a manner of acquiring a matching degree between content information and the target multimedia resource includes the following steps 2041 to 2043:

2041. Perform word segmentation on any piece of content information, to obtain multiple second words.

This step is similar to the step 1, and details are not described herein again.

2042. Acquire a matching degree between each second word and the target multimedia resource according to an occurrence frequency of the each second word in the target multimedia resource.

The matching degree between the second word and the target multimedia resource represents a degree of matching between the second word and the target multimedia resource. A higher occurrence frequency of the second word in the target multimedia resource indicates a higher matching degree. A lower occurrence frequency of the second word in the target multimedia resource indicates a lower matching degree.

In one implementation, step 2042 includes: acquiring a matching degree between each second word and the target multimedia resource according to a first occurrence frequency of any second word in the target multimedia resource and a second occurrence frequency of the second word in the content information.

In one implementation, for any second word $q_i$, a first occurrence frequency $f_i$ of the second word $q_i$ in the target multimedia resource, a second occurrence frequency $qf_i$ of the second word $q_i$ in the content information, and a matching degree $R(q_i, d)$ between the second word $q_i$ and the target multimedia resource meet the following relationships:

$$R(q_i, d) = \frac{f_i \cdot (k_1 + 1)}{f_i + M} \cdot \frac{qf_i \cdot (k_2 + 1)}{qf_i + k_2}$$

$$M = k_1 \cdot \left(1 - b + b \cdot \frac{dl}{avgdl}\right)$$

where $q_i$ represents an ith second word in multiple second words, and d represents the target multimedia resource; $k_1$, $k_2$, and b are each an adjustment factor and an arbitrary constant, for example, $k_1=2$, and b=0.75; M is an adjustment parameter, and dl is used for representing a length of the target multimedia resource, where for example, when the multimedia resource is a text resource, the length of the target multimedia resource is a quantity of words included in the text resource, or when the multimedia resource is a video resource or an image resource, the length of the target multimedia resource is a quantity of words included in a title and introduction information corresponding to the video resource or the image resource; and avg is used for representing an average value, and avgdl represents an average length of multiple candidate multimedia resources and the target multimedia resource.

In the relational expressions, b is used for adjusting an impact of the length of the multimedia resource on the matching degree. A larger b indicates a larger impact of the length of the multimedia resource on the matching degree between the second word and the target multimedia resource. A smaller b indicates a smaller impact of the length of the multimedia resource on the matching degree between the second word and the target multimedia resource. A larger relative length $$\frac{dl}{avgd}$$

of the multimedia resource indicates a larger M and a lower matching degree between the second word and the target multimedia resource.

In one implementation, for any second word $q_i$, a second occurrence frequency $qf_i$ of the second word $q_i$ in the content information is 1. In this implementation, a first occurrence frequency $f_i$ of the second word $q_i$ in the target multimedia resource and a matching degree $R(q_i, d)$ between the second word $q_i$ and the target multimedia resource d meet the following relationship:

$$R(q_i, d) = \frac{f_i \cdot (k_1 + 1)}{f_i + M}$$

2043. Weight the matching degrees between the multiple second words and the target multimedia resource according to weights of the multiple second words, to obtain a matching degree between the content information and the target multimedia resource.

A weight of a second word is used for representing a degree of contribution of a matching degree between the second word and the target multimedia resource to the matching degree between the content information and the target multimedia resource. A larger weight indicates a higher degree of contribution of the matching degree between the second word and the target multimedia resource.

In one implementation, step 2043 includes: determining a product of the matching degree between the each second word and the target multimedia resource and a corresponding weight, and determining a sum of the obtained multiple products as the matching degree between the content information and the target multimedia resource. The matching degree between each second word and the target multimedia resource and a weight of the each second word are determined, and a weighted summation is performed on the matching degrees between the multiple second words and the target multimedia resource, to obtain the matching degree between the content information and the target multimedia resource.

In another implementation, the matching degrees between the multiple second words and the target multimedia resource, a weight of the each second word, and a second matching degree Score (Q, d) between content information Q and the target multimedia resource d meet the following relationship:

$$\text{Score}(Q, d) = \sum_{i=1}^{n} W_i \cdot R(q_i, d)$$

where n represents a total quantity of the multiple second words, n is a positive integer not less than 2, $W_i$ represents a weight of an ith second word $q_i$ in the multiple second words, and $R(q_i, d)$ represents a matching degree between the second word $q_i$ and the target multimedia resource d.

In one implementation, step 2043 includes: determining a product of the matching degree between the each second word and the target multimedia resource and a corresponding weight, and determining a ratio of a sum of the obtained multiple products to a quantity of the multiple second words as the second matching degree between the content information and the target multimedia resource. The matching degree between the each second word and the target multimedia resource and the weight of the each second word are determined, and weighted averaging is performed on the matching degrees between the multiple second words and the target multimedia resource, to obtain the matching degree between the content information and the target multimedia resource.

For a manner of acquiring a weight of a second word, in one implementation, for any second word, a first quantity of multimedia resources including the second word is determined according to the multiple multimedia resources and the second word, and a weight of the second word is determined according to the first quantity and a total quantity of the multiple multimedia resources. The multiple multimedia resources include the target multimedia resource and multiple candidate multimedia resources, and may also include preset multiple multimedia resources.

In one implementation, for any second word $q_i$, the first quantity $n(q_i)$, the total quantity N, and a weight $W_i$ of the second word $q_i$ meet the following relationship:

$$W_i = \log \frac{N - n(q_i) + c}{n(q_i) + c}$$

where c is an adjustment parameter, an arbitrarily set constant. For example, c is 0.5.

In the relational expression, in multiple multimedia resources, a larger first quantity of multimedia resources including the second word $q_i$ indicates a lower distinguishing degree of the second word $q_i$ in different multimedia resource, a lower degree of importance of the second word $q_i$ when the matching degree with the target multimedia resource is determined according to the second word $q_i$, and thus a smaller weight of the second word $q_i$.

In one implementation, a second occurrence frequency $qf_i$ of the each second word $q_i$ in the content information is 1. In this implementation, a matching degree Score (Q, d) between content information Q and the target multimedia resource d meets the following relationship:

$$\text{Score}(Q, d) = \sum_{i=1}^{n} W_i \cdot \frac{f_i \cdot (k_1 + 1)}{f_i + k_1 \cdot \left(1 - b + b \cdot \frac{dl}{avgdl}\right)}$$

In another implementation, the computing device determines the matching degree between the each piece of information and the target multimedia resource according to a feature vector of the each piece of information and the feature vector of the target multimedia resource.

In one implementation, step 204 includes: determining a matching degree between each piece of content information and the target multimedia resource according to a feature vector of the each piece of content information and the feature vector of the target multimedia resource. The feature vector of the content information is a feature vector used for representing the content information, and different content information have different feature vectors.

This step is similar to the process of determining the matching degree between each candidate multimedia resource and the target multimedia resource in step 202, and details are not described herein again.

205. The computing device selects information about the target multimedia resource from the multiple pieces of information according to the matching degree between the each piece of information and the target multimedia resource.

In one implementation, when the information is content information, the computing device selects the information about the target multimedia resource from the multiple pieces of content information according to a matching degree between each of the multiple pieces of content information between the target multimedia resource. A matching degree between content information of the target multimedia resource and the target multimedia resource is greater than a matching degree between another piece of content information and the target multimedia resource.

For a manner of selecting the content information of the target multimedia resource, in one implementation, content information whose matching degree with the target multimedia resource is greater than a third threshold is selected from multiple pieces of content information and determined as the content information of the target multimedia resource.

The third threshold is an arbitrarily set value, such as 0.5 or 0.6. If the matching degree between the content information and the target multimedia resource is greater than the third threshold, it indicates that the content information is related to the target multimedia resource. In this implementation, the content information is determined as the content information of the target multimedia resource.

In another implementation, the multiple pieces of content information are sorted in ascending order of matching degrees with the target multimedia resource, and a reference quantity of pieces of content information having a highest matching degree are selected from the multiple pieces of content information and determined as reference multimedia resources.

The reference quantity is an arbitrarily set value, such as 3 or 4. Because a higher matching degree between the content information and the target multimedia resource indicates a higher degree of matching between the content information and the target multimedia resource, a reference quantity of pieces of content information having a highest matching degree are selected from the multiple pieces of content information as the content information of the target multimedia resource.

This embodiment of the present disclosure is described by using an example in which the content information is determined according to the second matching degree between the content information and the target multimedia resource. However, in another embodiment, steps 203 and 204 may not be performed, and the content information may be determined from the multiple pieces of content information in other manners.

In one implementation, the computing device selects, from the multiple pieces of information according to the multiple pieces of information and a classification label of each piece of information, information that belongs to a target classification label and that matches the target multimedia resource, and determines the selected information as the information about the target multimedia resource. For a manner of acquiring a classification label of a piece of information, in one implementation, the multiple pieces of information are processed based on a classification model, and the classification label of the each piece of information is determined.

When the information is content information, in one implementation, content information that belongs to a target classification label and that matches the target multimedia resource is selected from multiple pieces of content information according to the multiple pieces of content information and a classification label of each piece of content information and determined as the content information.

The classification label is used for describing a category to which the content information belongs. The classification labels include a poor-quality classification label and a high-quality classification label. The poor-quality classification label is a vulgar classification label, an abusive classification label, and a pan-low-quality classification label. The target classification label is a high-quality classification label, so that high-quality content information can be selected from the multiple pieces of content information as the content information.

For a manner of acquiring a classification label of content information, in one implementation, the multiple pieces of content information are processed based on a classification model, to determine a classification label of each piece of content information. The classification model is a trained model, used for determining a category to which the content information belongs, and generating a corresponding classification label for the content information.

For a training process of the classification model, multiple pieces of sample content information are acquired, the multiple pieces of sample content information are preprocessed, the preprocessed multiple pieces of sample content information are labeled, to determine a classification label of each piece of sample content information, and the classification model is trained by using the preprocessed multiple pieces of sample content information and the classification label of the each piece of sample content information.

The preprocessing includes traditional and simplified character conversion, uppercase and lowercase letter conversion, hidden text removal, and vulgar keyword cleaning, and further includes general filtering such as emotion filtering and sensitiveness filtering, rule discrimination involving emoticons, redundant character processing, grammar-based adjustment, and the like, to ensure accuracy of the sample content information. The rule discrimination is filtering out sensitive information such as mobile phone numbers and user accounts.

During labeling of the preprocessed multiple pieces of sample content information, the classification label of the each piece of sample content information is determined by manual labeling. The classification labels include a poor-quality classification label and a high-quality classification label. During determining of a poor-quality classification label, the poor-quality classification label is divided into multiple levels according to levels of poor quality of the content information, and different levels of poor quality correspond to different poor-quality classification labels. A high-quality classification label is determined according to content included in the content information and a quantity of likes corresponding to the content information.

In addition, when processing the content information, the classification model acquires the feature vector of the content information, and determines the classification label of the content information by classifying the content information by using the feature vector of the content information. The classification model includes a word vector acquisition submodel and a classification submodel. The word vector acquisition submodel is a text convolutional neural network (Text CNN) model or another model. The classification submodel is a support vector machine (SVM) model or another model.

With the development of the Internet, users are posting multimedia resource in the Internet. Text resources, image resources, and video resources are developing rapidly in the era of mobile Internet. After viewing a multimedia resource, a user can also comment, like, repost, add to favorites, or perform other interactive behaviors on the multimedia resource. The content information is mostly informal written comments, including many illegal characters such as emoticons and symbols, and the content information may be regularized through information cleaning. The cleaned content information is analyzed based on technologies related to natural language processing (lexical analysis, syntactic analysis, information extraction, and subject topic modeling). As a carrier of questions, suggestions, and attitudes of users, the content information is valuable for product evaluation and improvement. For user content information, text analysis is used to interpret the focus of attention of users, main discussion topics, emotional tendencies of users, main objects of main comments, and the like. The content information is various insights extended and expanded from this article, such as an emotional spark of thought, direct rubbing, and paragraphs and sentences liked by the users, to show that the users have read these exquisite and wonderful words by the writer. Different content information of different users is equivalent to direct opinion expression and communication of users of different fields, different levels, different worldviews, and different life environments. The content information enables people to discuss their views and share new information, and can also draw attention of people and encourage page browsing.

In the related technology, the content information of the target multimedia resource is posted by a user, or content information automatically generated for the target multimedia resource after the target multimedia resource is processed based on a network model. However, the content information obtained in such a manner of directly obtaining content information based on a network model has poor accuracy.

According to the method provided in this embodiment of the present disclosure, a feature vector of a target multimedia resource and feature vectors of multiple candidate multimedia resources are acquired; a reference multimedia resource whose feature vector matches the feature vector of the target multimedia resource is selected from the multiple candidate multimedia resources, so that the acquired reference multimedia resource can match the target multimedia resource; and information matching the target multimedia resource is selected from multiple pieces of information about the reference multimedia resource according to the multiple pieces of information and determined as information about the target multimedia resource. This provides a manner of automatically determining information for a target multimedia resource, and can ensure that the determined information matches the target multimedia resource, thereby improving information accuracy.

Migration of information about other multimedia resources to the information about the target multimedia resource prevents a quantity of pieces of information about the target multimedia resource from being 0, adjusts the cold start of the target multimedia resource, and enables the user to view the information about the target multimedia resource, thereby improving the attractiveness to the user.

Accuracy of the obtained reference multimedia resource is improved by determining the reference multimedia resource matching the target multimedia resource according to the matching degree between multimedia resources, and accuracy of the obtained information is improved by determining the information for the target multimedia resource according to the matching degrees between the multiple pieces of information and the target multimedia resource. In addition, the information is determined in the multiple pieces of information according to the classification label of the information, to ensure the quality of the information.

Figure 6:
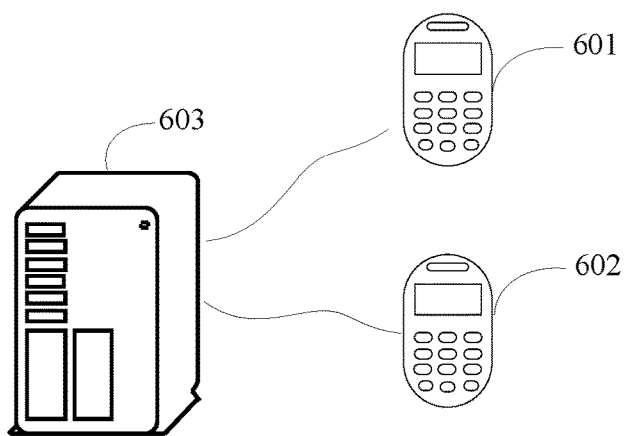
FIG. 6 is a schematic structural diagram of an information management system according to embodiment(s) of the present disclosure.

FIG. 6 is a schematic structural diagram of an information management system according to an embodiment of the present disclosure. As shown in FIG. 6, the information management system includes a first terminal 601, a second terminal 602, and a server 603. The first terminal 601 and the second terminal 602 each establish a communication connection with the server 603.

The server 603 publishes multiple multimedia resources for a user to view. The first terminal 601 views a first multimedia resource published by the server 603, and generates first content information for the first multimedia resource. The server 603 migrates the first content information by using the method provided in this embodiment of the present disclosure, and uses the first content information as content information of a second multimedia resource. The second terminal 602 views the first content information corresponding to the second multimedia resource when viewing the second multimedia resource published by the server 603.

Figure 7:
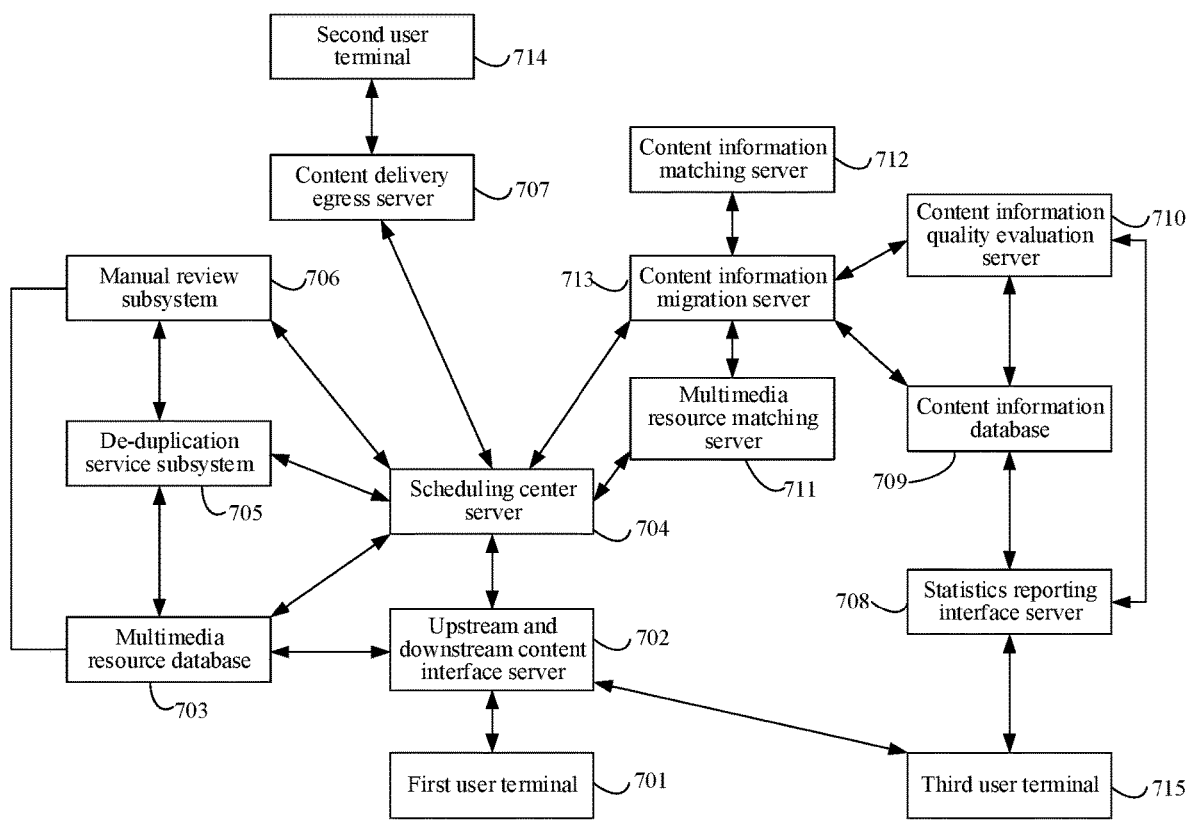
FIG. 7 is a schematic structural diagram of an information management system according to embodiment(s) of the present disclosure.

FIG. 7 is a schematic structural diagram of an information management system according to an embodiment of the present disclosure. As shown in FIG. 7, the information management system includes a first user terminal 701, an upstream and downstream content interface server 702, a multimedia resource database 703, a scheduling center server 704, a de-duplication service subsystem 705, a manual review subsystem 706, a content delivery egress server 707, a statistics reporting interface server 708, a content information database 709, a content information quality evaluation server 710, a multimedia resource matching server 711, a content information matching server 712, a content information migration server 713, a second user terminal 714, and a third user terminal 715. That the information is content information is used as an example below to describe a multimedia resource publishing process, a content information publishing process, and a content information migration process.

First Stage. Multimedia Resource Publishing Stage:

The first user terminal 701 is a multimedia resource generation terminal. The multimedia resource generation terminal is a content generator for professional generated content (PGC), user generated content (UGC), a multi-channel network (MCN), or professional user generated content (PUGC). A terminal or a back end application programming interface (API) system provides a multimedia resource, such as local or photographed image and text content, video or gallery content, music selected to accompany the local image and text content during photographing, a filter template, and image and text beautification function; first acquires an upload server interface address through communication with the upstream and downstream content interface server 702; and then uploads the multimedia resource to the upstream and downstream content interface server 702 according to the upload server interface address.

The upstream and downstream content interface server 702 receives the multimedia resource uploaded by the first user terminal 701, and writes the multimedia resource and meta information of the multimedia resource into the multimedia resource database 703. The multimedia resource further includes a title, a poster, a synopsis, a cover image, and a posting time. The meta information includes a file size, a cover image link, a bit rate, a file format, a title, a posting time, an author, a label indicating whether the resource is original, and other information. In addition, the upstream and downstream content interface server 702 submits the uploaded multimedia resource to the scheduling center server 704.

The multimedia resource database 703 is configured to store the multimedia resource and the meta information of the multimedia resource, and also includes categories and label information determined for the multimedia resource by the manual review subsystem 706. For example, categories include a first category, a second category, and a third category. The first category is science and technology, the second category is smartphone, and the third category is domestic mobile phone. The label information includes a scenery spot XX. The multimedia resource is a text resource for introducing the scenery spot XX.

The scheduling center server 704 is responsible for the entire scheduling process of multimedia resource flow, receives the incoming multimedia resource through the upstream and downstream content interface server 702, then acquires meta information of the multimedia resource from the multimedia resource database 703, schedules the manual review subsystem 706 and the de-duplication service subsystem 705 to process the multimedia resources, and controls a scheduling order and priority. For a review process of the multimedia resource, the de-duplication service subsystem 705 is first scheduled. De-duplication can be performed in implementations involving different bit rates, different resolutions, different sizes, a partial black screen, with or without filters, with or without logos, inserting part of advertisements in similar multimedia resource s, and clipping of opening credits and closing credits, and de-duplication can also be performed through determining whether a vector and a title are duplicate. The de-duplication service subsystem 705 is configured to perform a de-duplication service for the multimedia resource, vectorize the multimedia resource during the de-duplication service, then establish indexes of vectors, and then determine a similarity through comparison of a distance between the vectors; and vectorize the multimedia resource through Bidirectional Encoder Representations from Transformers (BERT), de-duplicate the short text of the title before de-duplication tasks, and perform various quality determining such as low-quality content filtering and classification on the multimedia resource. The de-duplication service subsystem 705 writes a result of the de-duplication into the multimedia resource database 703, and does not send identical multimedia resources to the manual review subsystem 706 for repeated secondary processing.

The manual review subsystem 706 reads the multimedia resource in the multimedia resource database 703, and perform a round of manual filtering to determine whether the content involves pornography, gambling, and political sensitive features. A second review of the multimedia resource on the basis of a view is to classify, label, or confirm the multimedia resource. Due to the low accuracy of review on a video resource by the de-duplication service subsystem 705, the secondary manual review process is performed on the basis of the view on the video resource by the de-duplication service subsystem 705. This improves accuracy of labeling the video resource and improves processing efficiency.

The scheduling center server 704 further sends the multimedia resource reviewed by the manual review subsystem 706 to the content delivery egress server 707.

The content delivery egress server 707 receives the multimedia resource sent by the scheduling center server 704 and reviewed by the manual review subsystem 706, and publishes the multimedia resource in the form of feeds, for viewing by the second user terminal 714.

Second Stage. Content Information Publishing Stage:

As a consumer, the third user terminal 715 acquires, through communication with the upstream and downstream content interface server 702, index information for accessing the multimedia resource, then downloads the corresponding multimedia resource, and plays and views the corresponding multimedia resource through a local player. Moreover, behavior data, frame freezing, a loading time, and play clicks during upload and download are reported to the statistics reporting interface server 708. In addition, interactive information on the multimedia resource by the third user terminal 715, such as comments, likes, reposts, and adding to favorites on the multimedia resource, is reported to the statistics reporting interface server 708. The third user terminal 715 can further report low-quality content information in the multimedia resource, and report the reported content information to the content information database 709. The information goes through the manual review subsystem 706 before being used as a sample.

The statistics reporting interface server 708 receives the content information for the multimedia resource that is uploaded by the third user terminal 715, and writes the content information into the content information database 709.

The content information database 709 is configured to store the content information, and provide the content information and other interactive data to the content information quality evaluation server 710 and the content information migration server 713.

Third Stage. Content Information Migration Stage:

The content information quality evaluation server 710 models and classifies quality of the content information of the multimedia resource according to the method provided in the embodiment, to obtain a classification label of each piece of content information.

The multimedia resource matching server 711 determines a matching reference multimedia resource for the target multimedia resource according to the method provided in the embodiment, and provides a matching result to the content information migration server 713.

The content information matching server 712 determines, according to the method provided in the embodiment, content information matching the target multimedia resource in multiple pieces of content information of the reference multimedia resource, and provides a matching result to the content information migration server 713.

The content information migration server 713 implements content information migration through a scheduling server according to the matching results of the multimedia resource matching server 711 and the content information matching server 712, and generates the content information for the target multimedia resource.

The scheduling center server 704 further schedules a content information migration service to perform migration of high-quality content information, and outputs the migrated content information to the content delivery egress server 707. The content delivery egress server 707 sends the migrated content information to the second user terminal 714, for viewing by the second user terminal 714.

Figure 8:
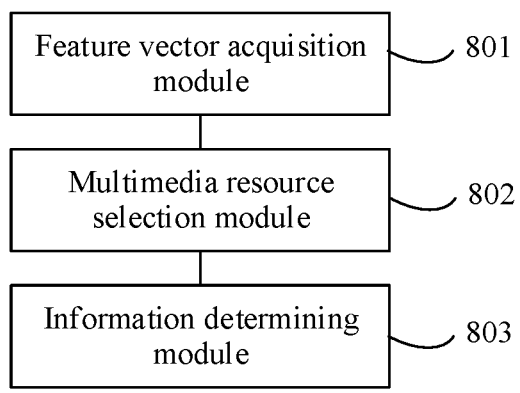
FIG. 8 is a schematic structural diagram of an information determining apparatus according to embodiment(s) of the present disclosure.

FIG. 8 is a schematic structural diagram of an information determining apparatus according to an embodiment of the present disclosure. As shown in FIG. 8, the apparatus includes: a feature vector acquisition module 801, configured to acquire a feature vector of a target multimedia resource and feature vectors of multiple candidate multimedia resources; a multimedia resource selection module 802, configured to select, from the multiple candidate multimedia resources, a reference multimedia resource whose feature vector matches the feature vector of the target multimedia resource; and an information determining module 803, configured to select information matching the target multimedia resource from multiple pieces of information about the reference multimedia resource according to the multiple pieces of information, and determine the selected information as information about the target multimedia resource.

According to the apparatus provided in this embodiment of the present disclosure, a feature vector of a target multimedia resource and feature vectors of multiple candidate multimedia resources are acquired; a reference multimedia resource whose feature vector matches the feature vector of the target multimedia resource is selected from the multiple candidate multimedia resources, so that the acquired reference multimedia resource can match the target multimedia resource; and information matching the target multimedia resource is selected from multiple pieces of information about the reference multimedia resource according to the multiple pieces of information and determined as information about the target multimedia resource. This provides a manner of automatically determining information for a target multimedia resource, and can ensure that the determined information matches the target multimedia resource, thereby improving information accuracy.

Figure 9:
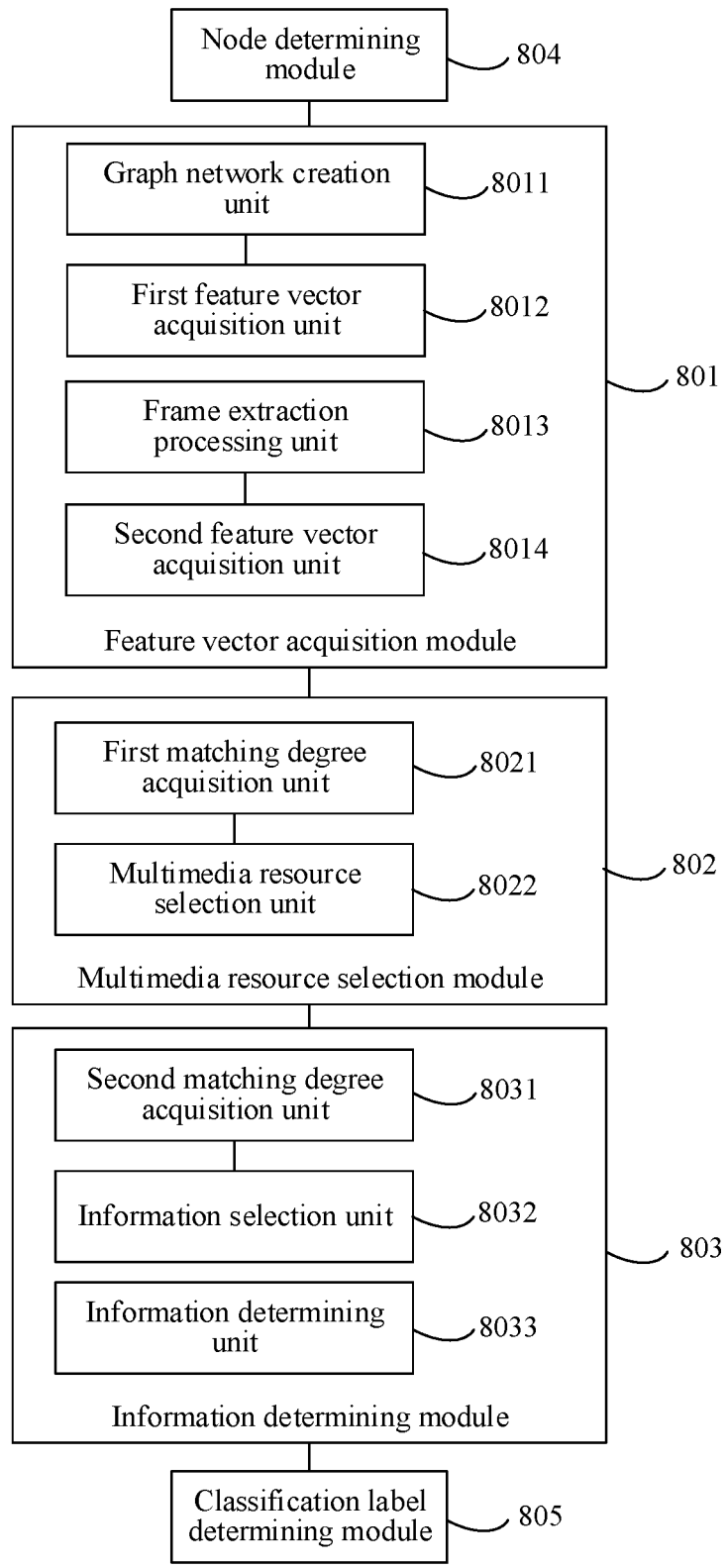
FIG. 9 is a schematic structural diagram of an information determining apparatus according to embodiment(s) of the present disclosure.

In certain embodiment(s), as shown in FIG. 9, the feature vector acquisition module 801 includes: a graph network creation unit 8011, configured to create a graph network according to the target multimedia resource and the multiple candidate multimedia resources, the graph network including a target multimedia resource node corresponding to the target multimedia resource and multiple candidate multimedia resource nodes corresponding to the multiple candidate multimedia resources, and any two multimedia resource nodes meeting a first association condition being connected; and a first feature vector acquisition unit 8012, configured to process the graph network based on a first feature extraction model, to acquire a feature vector of the target multimedia resource node and feature vectors of the multiple candidate multimedia resource nodes, use the feature vector of the target multimedia resource node as the feature vector of the target multimedia resource, and use the feature vectors of the multiple candidate multimedia resource nodes as the feature vectors of the multiple candidate multimedia resources.

In certain embodiment(s), the graph network creation unit 8011 is further configured to perform word segmentation on a text resource in the target multimedia resource and text resources in the multiple candidate multimedia resources to obtain multiple first words; and create a graph network according to the target multimedia resource, the multiple candidate multimedia resources, and the multiple first words, the graph network including a target multimedia resource node corresponding to the target multimedia resource, multiple candidate multimedia resource nodes corresponding to the multiple candidate multimedia resources, and multiple word nodes corresponding to the multiple first words, and a word node and a multimedia resource node that meet a second association condition being connected.

In certain embodiment(s), as shown in FIG. 9, the apparatus further includes: a node determining module 804, configured to: in response to an occurrence frequency of any first word in a text resource of any multimedia resource being greater than a first threshold, determine that a word node corresponding to the first word and a multimedia resource node corresponding to the multimedia resource meet the second association condition.

In certain embodiment(s), as shown in FIG. 9, the multimedia resources include a video resource; and the feature vector acquisition module 801 includes: a frame extraction processing unit 8013, configured to separately perform frame extraction on the target multimedia resource and the multiple candidate multimedia resources, to obtain multiple video frames corresponding to the target multimedia resource and multiple video frames corresponding to the multiple candidate multimedia resources; and a second feature vector acquisition unit 8014, configured to separately process the multiple video frames corresponding to the target multimedia resource and the multiple video frames corresponding to the multiple candidate multimedia resources based on a second feature extraction model, to obtain the feature vector of the target multimedia resource and the feature vectors of the multiple candidate multimedia resources.

In certain embodiment(s), the second feature vector acquisition unit 8014 is further configured to separately process multiple video frames corresponding to any multimedia resource based on the second feature extraction model, to obtain feature vectors of the multiple video frames; and fuse the feature vectors of the multiple video frames, to obtain a feature vector of the multimedia resource.

In certain embodiment(s), as shown in FIG. 9, the multimedia resource selection module 802 includes: a first matching degree acquisition unit 8021, configured to acquire a matching degree between each candidate multimedia resource and the target multimedia resource according to the feature vector of the target multimedia resource and the feature vectors of the multiple candidate multimedia resources; and a multimedia resource selection unit 8022, configured to select the reference multimedia resource from the multiple candidate multimedia resources according to the matching degree between the each candidate multimedia resource and the target multimedia resource, a matching degree between the reference multimedia resource and the target multimedia resource being greater than a matching degree between another candidate multimedia resource and the target multimedia resource.

In certain embodiment(s), as shown in FIG. 9, the information determining module 803 includes: a second matching degree acquisition unit 8031, configured to acquire a matching degree between each of the multiple pieces of information about the reference multimedia resource and the target multimedia resource according to the multiple pieces of information; and an information selection unit 8032, configured to select the information about the target multimedia resource from the multiple pieces of information according to the matching degree between the each piece of information and the target multimedia resource, a matching degree between the information about the target multimedia resource and the target multimedia resource being greater than a matching degree between another piece of information and the target multimedia resource.

In certain embodiment(s), the second matching degree acquisition unit 8031 is further configured to perform word segmentation on any piece of information, to obtain multiple second words; acquire a matching degree between each second word and the target multimedia resource according to an occurrence frequency of the each second word in the target multimedia resource; and weight the matching degrees between the multiple second words and the target multimedia resource according to weights of the multiple second words, to obtain a matching degree between the information and the target multimedia resource.

In certain embodiment(s), the second matching degree acquisition unit 8031 is further configured to determine the matching degree between the each piece of information and the target multimedia resource according to a feature vector of the each piece of information and the feature vector of the target multimedia resource.

In certain embodiment(s), as shown in FIG. 9, the information determining module 803 includes: an information determining unit 8033, configured to select, from the multiple pieces of information according to the multiple pieces of information and a classification label of each piece of information, information that belongs to a target classification label and that matches the target multimedia resource, and determine the selected information as the information about the target multimedia resource.

In certain embodiment(s), as shown in FIG. 9, the apparatus further includes: a classification label determining module 805, configured to process the multiple pieces of information based on a classification model, and determine the classification label of the each piece of information.

Figure 10:
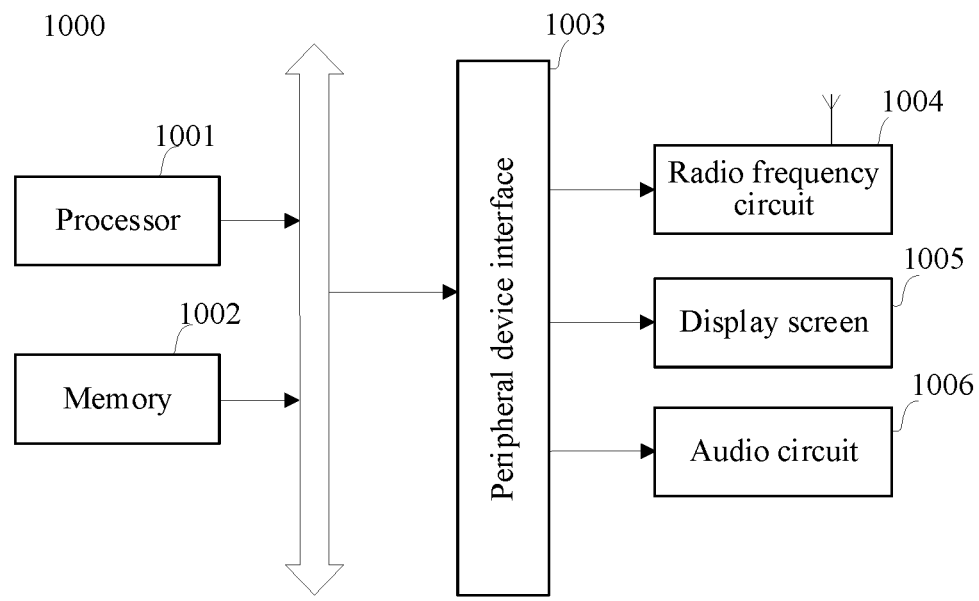
FIG. 10 is a schematic structural diagram of a terminal according to embodiment(s) of the present disclosure.

FIG. 10 is a schematic structural diagram of a terminal according to an embodiment of the present disclosure, for implementing the operations performed by the computing device in the embodiment. A terminal 1000 is a portable mobile terminal, such as a smartphone, a tablet computer, a Moving Picture Experts Group audio layer III (MP3) player, a Moving Picture Experts Group audio layer IV (MP4) player, a notebook computer, a desktop computer, a head-mounted device, a smart TV, a smart speaker, a smart remote, a smart microphone, or any other smart terminal. The terminal 1000 may also be referred to as user equipment, a portable terminal, a laptop terminal, or a desktop terminal, among other names.

Generally, the terminal 1000 includes a processor 1001 and a memory 1002.

The processor 1001 includes one or more processing cores, for example, a 4-core processor or an 8-core processor. The memory 1002 includes one or more computer-readable storage media, and the computer-readable storage media are non-transitory, and is configured to store at least one instruction, the at least one instruction being configured to be executed by the processor 1001 to implement the information determining method provided in the method embodiments of the present disclosure.

In some embodiments, the terminal 1000 may include a peripheral interface 1003 and at least one peripheral. The processor 1001, the memory 1002, and the peripheral interface 1003 may be connected through a bus or a signal cable. Each peripheral is connected to the peripheral interface 1003 through a bus, a signal cable, or a circuit board. In certain embodiment(s), the peripheral includes: at least one of a radio frequency (RF) circuit 1004, a display screen 1005, and an audio circuit 1006.

The RF circuit 1004 is configured to receive and transmit an RF signal, which is also referred to as an electromagnetic signal. The radio frequency circuit 1004 communicates with a communication network and another communication device by using the electromagnetic signal.

The display screen 1005 is configured to display a user interface (UI). The UI may include a graph, a text, an icon, a video, and any combination thereof. The display screen 1005 is a touchscreen, further configured to provide virtual buttons and/or a virtual keyboard.

The audio circuit 1006 includes a microphone and a speaker. The microphone is configured to acquire audio signals of a user and an environment, and convert the audio signals into an electrical signal to input to the processor 1001 for processing, or input to the RF circuit 1004 for implementing voice communication. For the purpose of stereo acquisition or noise reduction, there are a plurality of microphones, disposed at different parts of the terminal 1000 respectively. The microphone is also an array microphone or an omni-directional acquisition microphone. The loudspeaker is configured to convert electric signals from the processor 1001 or the radio frequency circuit 1004 into audio signals.

A person skilled in the art understands that the structure shown in FIG. 10 does not constitute a limitation to the terminal 1000, and the terminal may include more or fewer components than those shown in the figure, or some components may be combined, or a different component arrangement may be used.

Figure 11:
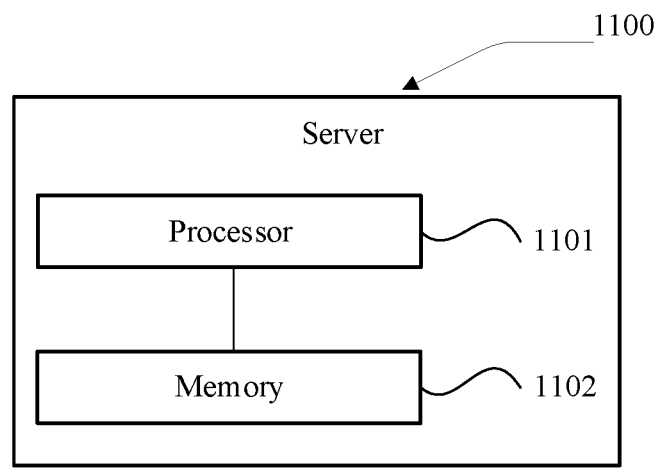
FIG. 11 is a schematic structural diagram of a server according to embodiment(s) of the present disclosure.

FIG. 11 is a schematic structural diagram of a server according to an embodiment of the present disclosure. The server 1100 may vary greatly due to different configurations or performance, and includes one or more processors (central processing units (CPUs)) 1101 and one or more memories 1102. The memory 1102 stores at least one instruction, the at least one instruction being loaded and executed by the processor 1101 to implement the methods provided in the method embodiments. The server also has a wired or wireless network interface, a keyboard, an input/output interface and other components to facilitate input/output. The server also includes other components for implementing device functions. Details are not described herein again.

The server 1100 is configured to perform the information determining method.

An embodiment of the present disclosure further provides a computing device. The computing device includes a processor and a memory, the memory storing at least one instruction, the at least one instruction being loaded and executed by the processor to implement the information determining method of the embodiments.

An embodiment of the present disclosure further provides a computer-readable storage medium, storing at least one instruction, the instruction being loaded and executed by a processor to implement the information determining method according to the embodiments.

An embodiment of the present disclosure further provides a computer program, the computer program storing at least one instruction, the at least one instruction being loaded and executed by a processor to implement the information determining method according to the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps in the embodiments may be implemented by hardware or a program instructing relevant hardware. The program may be stored in a computer-readable storage medium. The storage medium may be: a ROM, a magnetic disk, or an optical disc, or the like.

The descriptions are embodiments of the embodiments of the present disclosure, but are not intended to limit the embodiments of the present disclosure. Any modification, equivalent replacement, or improvement made within the spirit and principle of the embodiments of the present disclosure shall fall within the protection scope of the present disclosure.

What is claimed is:

1. An information determining method, comprising: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, comprising: acquiring a matching degree between each of the multiple pieces of information about the reference multimedia resource and the target multimedia resource according to the multiple pieces of information, the matching degree determined by an adjustable parameter representing a length of the target multimedia resource, the length of the target multimedia resource being inversely proportional to the matching degree; and selecting the information about the target multimedia resource from the multiple pieces of information according to the matching degree between the each piece of information and the target multimedia resource; and determining the selected information as information about the target multimedia resource.

2. The method according to claim 1, wherein acquiring the feature vector of the target multimedia resource and the feature vectors of multiple candidate multimedia resources comprises: creating a graph network according to the target multimedia resource and the multiple candidate multimedia resources, the graph network including a target multimedia resource node corresponding to the target multimedia resource and multiple candidate multimedia resource nodes corresponding to the multiple candidate multimedia resources, and any two multimedia resource nodes meeting a first association condition being connected; and processing the graph network based on a first feature extraction model, to acquire a feature vector of the target multimedia resource node and feature vectors of the multiple candidate multimedia resource nodes, using the feature vector of the target multimedia resource node as the feature vector of the target multimedia resource, and using the feature vectors of the multiple candidate multimedia resource nodes as the feature vectors of the multiple candidate multimedia resources.

3. The method according to claim 2, wherein creating the graph network comprises: performing word segmentation on a text resource in the target multimedia resource and text resources in the multiple candidate multimedia resources to obtain multiple first words; and creating a graph network according to the target multimedia resource, the multiple candidate multimedia resources, and the multiple first words, the graph network including a target multimedia resource node corresponding to the target multimedia resource, multiple candidate multimedia resource nodes corresponding to the multiple candidate multimedia resources, and multiple word nodes corresponding to the multiple first words, and a word node and a multimedia resource node that meet a second association condition being connected.

4. The method according to claim 3, further comprising: in response to an occurrence frequency of any first word in a text resource of any multimedia resource being greater than a first threshold, determining that a word node corresponding to the first word and a multimedia resource node corresponding to the multimedia resource meet the second association condition.

5. The method according to claim 1, wherein the multimedia resources include a video resource, and wherein acquiring the feature vector of the target multimedia resource and the feature vectors of the multiple candidate multimedia resources comprises: performing frame extraction on the target multimedia resource and the multiple candidate multimedia resources, to obtain multiple video frames corresponding to the target multimedia resource and multiple video frames corresponding to the multiple candidate multimedia resources; and processing the multiple video frames corresponding to the target multimedia resource and the multiple video frames corresponding to the multiple candidate multimedia resources based on a second feature extraction model, to obtain the feature vector of the target multimedia resource and the feature vectors of the multiple candidate multimedia resources.

6. The method according to claim 5, wherein processing the multiple video frames comprises: processing multiple video frames corresponding to any multimedia resource based on the second feature extraction model, to obtain feature vectors of the multiple video frames; and fusing the feature vectors of the multiple video frames, to obtain a feature vector of the multimedia resource.

7. The method according to claim 1, wherein selecting the reference multimedia resource comprises: determining a matching degree between each candidate multimedia resource and the target multimedia resource according to the feature vector of the target multimedia resource and the feature vectors of the multiple candidate multimedia resources; and selecting the reference multimedia resource from the multiple candidate multimedia resources according to the matching degree between the each candidate multimedia resource and the target multimedia resource, a matching degree between the reference multimedia resource and the target multimedia resource being greater than a matching degree between another candidate multimedia resource and the target multimedia resource.

8. The method according to claim 1, wherein acquiring the matching degree comprises: performing word segmentation on any piece of information, to obtain multiple second words; acquiring a matching degree between each second word and the target multimedia resource according to an occurrence frequency of the each second word in the target multimedia resource; and weighting the matching degrees between the multiple second words and the target multimedia resource according to weights of the multiple second words, to obtain a matching degree between the information and the target multimedia resource.

9. The method according to claim 1, wherein acquiring the matching degree comprises: determining the matching degree between the each piece of information and the target multimedia resource according to a feature vector of the each piece of information and the feature vector of the target multimedia resource.

10. The method according to claim 1, wherein selecting the information corresponding to the target multimedia resource comprises: selecting, from the multiple pieces of information according to the multiple pieces of information and a classification label of each piece of information, information that belongs to a target classification label and that matches the target multimedia resource, and determining the selected information as the information about the target multimedia resource.

11. The method according to claim 10, further comprising: processing the multiple pieces of information based on a classification model, and determining the classification label of the each piece of information.

12. An information determining apparatus, comprising: a memory storing computer program instructions; and a processor coupled to the memory and configured to execute the computer program instructions and perform: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, comprising: acquiring a matching degree between each of the multiple pieces of information about the reference multimedia resource and the target multimedia resource according to the multiple pieces of information, the matching degree determined by an adjustable parameter representing a length of the target multimedia resource, the length of the target multimedia resource being inversely proportional to the matching degree; and selecting the information about the target multimedia resource from the multiple pieces of information according to the matching degree between the each piece of information and the target multimedia resource; and determine the selected information as information about the target multimedia resource.

13. The information determining apparatus according to claim 12, wherein acquiring the feature vector of the target multimedia resource and the feature vectors of multiple candidate multimedia resources includes: creating a graph network according to the target multimedia resource and the multiple candidate multimedia resources, the graph network including a target multimedia resource node corresponding to the target multimedia resource and multiple candidate multimedia resource nodes corresponding to the multiple candidate multimedia resources, and any two multimedia resource nodes meeting a first association condition being connected; and processing the graph network based on a first feature extraction model, to acquire a feature vector of the target multimedia resource node and feature vectors of the multiple candidate multimedia resource nodes, using the feature vector of the target multimedia resource node as the feature vector of the target multimedia resource, and using the feature vectors of the multiple candidate multimedia resource nodes as the feature vectors of the multiple candidate multimedia resources.

14. The information determining apparatus according to claim 13, wherein creating the graph network includes: performing word segmentation on a text resource in the target multimedia resource and text resources in the multiple candidate multimedia resources to obtain multiple first words; and creating a graph network according to the target multimedia resource, the multiple candidate multimedia resources, and the multiple first words, the graph network including a target multimedia resource node corresponding to the target multimedia resource, multiple candidate multimedia resource nodes corresponding to the multiple candidate multimedia resources, and multiple word nodes corresponding to the multiple first words, and a word node and a multimedia resource node that meet a second association condition being connected.

15. The information determining apparatus according to claim 14, wherein the processor is further configured to execute the computer program instructions and perform: in response to an occurrence frequency of any first word in a text resource of any multimedia resource being greater than a first threshold, determining that a word node corresponding to the first word and a multimedia resource node corresponding to the multimedia resource meet the second association condition.

16. The information determining apparatus according to claim 12, wherein the multimedia resources include a video resource, and wherein acquiring the feature vector of the target multimedia resource and the feature vectors of the multiple candidate multimedia resources includes: performing frame extraction on the target multimedia resource and the multiple candidate multimedia resources, to obtain multiple video frames corresponding to the target multimedia resource and multiple video frames corresponding to the multiple candidate multimedia resources; and processing the multiple video frames corresponding to the target multimedia resource and the multiple video frames corresponding to the multiple candidate multimedia resources based on a second feature extraction model, to obtain the feature vector of the target multimedia resource and the feature vectors of the multiple candidate multimedia resources.

17. The information determining apparatus according to claim 16, wherein processing the multiple video frames includes: processing multiple video frames corresponding to any multimedia resource based on the second feature extraction model, to obtain feature vectors of the multiple video frames; and fusing the feature vectors of the multiple video frames, to obtain a feature vector of the multimedia resource.

18. A non-transitory computer-readable storage medium storing computer program instructions executable by at least one processor to perform: acquiring a feature vector of a target multimedia resource and feature vectors of multiple candidate multimedia resources; selecting, from the multiple candidate multimedia resources, a reference multimedia resource whose feature vector corresponds to the feature vector of the target multimedia resource; and selecting information corresponding to the target multimedia resource from multiple pieces of information about the reference multimedia resource according to the multiple pieces of information, comprising: acquiring a matching degree between each of the multiple pieces of information about the reference multimedia resource and the target multimedia resource according to the multiple pieces of information, the matching degree determined by an adjustable parameter representing a length of the target multimedia resource, the length of the target multimedia resource being inversely proportional to the matching degree; and selecting the information about the target multimedia resource from the multiple pieces of information according to the matching degree between the each piece of information and the target multimedia resource; and determining the selected information as information about the target multimedia resource.

19. The method according to claim 1, wherein the adjustable parameter comprises at least one adjustable factor for adjusting an impact of the length of the target multimedia resource on the matching degree.

20. The method according to claim 1, wherein when the target multimedia resource is a text resource, the length of the target multimedia resource is a quantity of words included in the text resource, or when the target multimedia resource is a video resource or an image resource, the length of the target multimedia resource is a quantity of words included in a title and introduction information corresponding to the video resource or the image resource.

* * * * *